US010125274B2

(12) United States Patent
Zhao et al.

(10) Patent No.: US 10,125,274 B2
(45) Date of Patent: Nov. 13, 2018

(54) COATINGS CONTAINING CARBON COMPOSITE FILLERS AND METHODS OF MANUFACTURE

(71) Applicants: Lei Zhao, Houston, TX (US); Zhiyue Xu, Cypress, TX (US); Bennett M. Richard, Kingwood, TX (US)

(72) Inventors: Lei Zhao, Houston, TX (US); Zhiyue Xu, Cypress, TX (US); Bennett M. Richard, Kingwood, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 92 days.

(21) Appl. No.: 15/144,856

(22) Filed: May 3, 2016

(65) Prior Publication Data
US 2017/0321069 A1    Nov. 9, 2017

(51) Int. Cl.
| | | |
|---|---|---|
| *B05D 7/02* | (2006.01) | |
| *B05D 7/14* | (2006.01) | |
| *C04B 41/88* | (2006.01) | |
| *C23C 4/04* | (2006.01) | |
| *C23C 4/06* | (2016.01) | |
| *C23C 26/00* | (2006.01) | |
| *C23C 18/16* | (2006.01) | |
| *C23C 18/36* | (2006.01) | |
| *C23C 18/50* | (2006.01) | |
| *C25D 3/12* | (2006.01) | |
| *C25D 15/00* | (2006.01) | |
| *C09D 5/24* | (2006.01) | |
| *C09D 7/61* | (2018.01) | |
| *C09D 7/12* | (2006.01) | |

(52) U.S. Cl.
CPC ............. *C09D 7/1216* (2013.01); *B05D 7/02* (2013.01); *B05D 7/14* (2013.01); *C04B 41/88* (2013.01); *C09D 5/24* (2013.01); *C09D 7/61* (2018.01); *C23C 4/04* (2013.01); *C23C 4/06* (2013.01); *C23C 26/00* (2013.01); *C25D 15/00* (2013.01); *C23C 18/1662* (2013.01); *C23C 18/36* (2013.01); *C23C 18/50* (2013.01); *C25D 3/12* (2013.01)

(58) Field of Classification Search
CPC .......... C09D 7/1216; C09D 5/24; C09D 7/61; B05D 7/02; B05D 7/14; C04B 41/88; C23C 4/04; C23C 4/06; C23C 26/00; C23C 18/1662; C23C 18/36; C23C 18/50; C25D 15/00; C25D 3/12
See application file for complete search history.

(56) References Cited

U.S. PATENT DOCUMENTS

| | | |
|---|---|---|
| 2,462,067 A | 2/1949 | Buckendale |
| 3,145,778 A | 8/1964 | Grekel et al. |
| 3,246,369 A | 4/1966 | Rhoads et al. |
| 3,561,770 A | 2/1971 | Corsi et al. |
| 3,666,852 A | 5/1972 | Burke |
| 3,807,996 A | 4/1974 | Sara |
| 3,904,405 A | 9/1975 | Russell et al. |
| 3,967,935 A | 7/1976 | Frehn |
| 3,981,427 A | 9/1976 | Brookes |
| 4,116,451 A | 9/1978 | Nixon et al. |
| 4,205,858 A | 6/1980 | Shimazaki et al. |
| 4,234,638 A | 11/1980 | Yamazoe et al. |
| 4,270,569 A | 6/1981 | Reay et al. |
| 4,372,393 A | 2/1983 | Baker |
| 4,383,970 A | 5/1983 | Komuro et al. |
| 4,426,086 A | 1/1984 | Fournie et al. |
| 4,567,103 A | 1/1986 | Sara |
| 4,743,033 A | 5/1988 | Guess |
| 4,780,226 A | 10/1988 | Sheets et al. |
| 4,789,166 A | 12/1988 | Rericha et al. |
| 4,798,771 A | 1/1989 | Vogel |
| 4,799,956 A | 1/1989 | Vogel |
| 4,826,181 A | 5/1989 | Howard et al. |
| 4,885,218 A | 12/1989 | Andou et al. |
| 5,117,913 A | 6/1992 | Thernig |
| 5,134,030 A | 7/1992 | Ueda et al. |
| 5,163,692 A | 11/1992 | Schofield et al. |
| 5,195,583 A | 3/1993 | Toon et al. |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |

(Continued)

FOREIGN PATENT DOCUMENTS

| | | |
|---|---|---|
| CA | 2429780 A1 | 12/2003 |
| CN | 102775669 | 11/2012 |

(Continued)

OTHER PUBLICATIONS

International Search Report, International Application No. PCT/US2017/025000, dated Aug. 18, 2017, Korean Intellectual Property Office; International Search Report 4 pages.

(Continued)

*Primary Examiner* — Patrick D Niland
(74) *Attorney, Agent, or Firm* — Cantor Colburn LLP

(57) ABSTRACT

An article comprises a substrate, a coating disposed on a surface of the substrate. The coating comprises a carbon composite dispersed in one or more of the following: a polymer matrix; a metallic matrix; or a ceramic matrix. The carbon composite comprises carbon and a binder containing one or more of the following: $SiO_2$; Si; B; $B_2O_3$; a filler metal; or an alloy of the filler metal.

18 Claims, 1 Drawing Sheet

(56) References Cited

U.S. PATENT DOCUMENTS

| | | |
|---|---|---|
| 5,257,603 A | 11/1993 | Bauer et al. |
| 5,283,121 A | 2/1994 | Bordner |
| 5,286,574 A | 2/1994 | Foster et al. |
| 5,362,074 A | 11/1994 | Gallo et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,509,555 A | 4/1996 | Chiang et al. |
| 5,522,603 A | 6/1996 | Naitou et al. |
| 5,545,474 A | 8/1996 | Podlaseck et al. |
| 5,597,168 A | 1/1997 | Antonini |
| 5,730,444 A | 3/1998 | Notter |
| 5,765,838 A | 6/1998 | Ueda et al. |
| 5,791,657 A | 8/1998 | Cain et al. |
| 5,941,313 A | 8/1999 | Arizmendi |
| 5,968,653 A | 10/1999 | Coppella et al. |
| 5,976,437 A | 11/1999 | Marrocco, III et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richy, III |
| 6,152,453 A | 11/2000 | Kashima et al. |
| 6,161,838 A | 12/2000 | Balsells |
| 6,182,974 B1 | 2/2001 | Harrelson |
| 6,183,667 B1 | 2/2001 | Kubo et al. |
| 6,234,490 B1 | 5/2001 | Champlin |
| 6,258,457 B1 | 7/2001 | Ottinger et al. |
| 6,273,431 B1 | 8/2001 | Webb |
| 6,383,656 B1 | 5/2002 | Kimura et al. |
| 6,506,482 B1 | 1/2003 | Burton et al. |
| 6,581,682 B1 | 6/2003 | Parent et al. |
| 6,585,053 B2 | 7/2003 | Coon et al. |
| 6,789,634 B1 | 9/2004 | Denton |
| 6,880,639 B2 | 4/2005 | Rhodes et al. |
| 6,933,531 B1 | 8/2005 | Ishikawa et al. |
| 7,105,115 B2 | 9/2006 | Shin |
| 7,138,190 B2 | 11/2006 | Bauer et al. |
| 7,470,468 B2 | 12/2008 | Mercuri et al. |
| 7,666,469 B2 | 2/2010 | Weintritt et al. |
| 7,758,783 B2 | 7/2010 | Shi et al. |
| 8,604,157 B2 | 12/2013 | Gerrard et al. |
| 8,929,119 B2 | 1/2015 | Lee et al. |
| 8,939,222 B2 | 1/2015 | Ren et al. |
| 9,120,898 B2 | 9/2015 | Ren et al. |
| 9,144,925 B2 | 9/2015 | Ren et al. |
| 9,325,012 B1 | 4/2016 | Xu et al. |
| 2001/0003389 A1 | 6/2001 | Pippert |
| 2001/0039966 A1 | 11/2001 | Walpole et al. |
| 2002/0114952 A1 | 8/2002 | Ottinger et al. |
| 2002/0140180 A1 | 10/2002 | Waltenberg et al. |
| 2003/0137112 A1 | 7/2003 | Richter et al. |
| 2004/0026085 A1 | 2/2004 | Vacik et al. |
| 2004/0043220 A1 | 3/2004 | Hirose et al. |
| 2004/0097360 A1 | 5/2004 | Benitsch et al. |
| 2004/0121152 A1 | 6/2004 | Toas |
| 2004/0127621 A1 | 7/2004 | Drzal et al. |
| 2004/0155382 A1 | 8/2004 | Huang et al. |
| 2004/0178626 A1 | 9/2004 | Segreto |
| 2004/0186201 A1 | 9/2004 | Stoffer et al. |
| 2004/0256605 A1 | 12/2004 | Reinheimer et al. |
| 2005/0202245 A1 | 9/2005 | Mercuri et al. |
| 2006/0042801 A1 | 3/2006 | Hackworth et al. |
| 2006/0124304 A1 | 6/2006 | Bloess et al. |
| 2006/0220320 A1 | 10/2006 | Potier et al. |
| 2006/0249917 A1 | 11/2006 | Kosty |
| 2006/0272321 A1 | 12/2006 | Mockenhaupt et al. |
| 2006/0272806 A1 | 12/2006 | Wilkie et al. |
| 2007/0009725 A1 | 1/2007 | Noguchi et al. |
| 2007/0054121 A1 | 3/2007 | Weintritt et al. |
| 2007/0142547 A1 | 6/2007 | Vaidya et al. |
| 2007/0158619 A1 | 7/2007 | Wang et al. |
| 2007/0243407 A1 | 10/2007 | Delannay et al. |
| 2007/0257405 A1 | 11/2007 | Freyer |
| 2008/0128067 A1 | 6/2008 | Sayir et al. |
| 2008/0152577 A1 | 6/2008 | Addiego et al. |
| 2008/0175764 A1 | 7/2008 | Sako |
| 2008/0240879 A1 | 10/2008 | Dourfaye et al. |
| 2008/0279710 A1 | 11/2008 | Zhamu et al. |
| 2008/0289813 A1 | 11/2008 | Gewily et al. |
| 2009/0059474 A1 | 3/2009 | Zhamu et al. |
| 2009/0075120 A1 | 3/2009 | Cornie et al. |
| 2009/0130515 A1 | 5/2009 | Son et al. |
| 2009/0136740 A1* | 5/2009 | Reynolds ................. C23C 4/06 428/325 |
| 2009/0151847 A1 | 6/2009 | Zhamu et al. |
| 2009/0189358 A1 | 7/2009 | Briscoe et al. |
| 2009/0194205 A1 | 8/2009 | Loffler et al. |
| 2009/0302552 A1 | 12/2009 | Leinfelder |
| 2010/0003530 A1 | 1/2010 | Ganguli et al. |
| 2010/0098956 A1 | 4/2010 | Sepeur et al. |
| 2010/0122821 A1 | 5/2010 | Corre et al. |
| 2010/0143690 A1 | 6/2010 | Romero et al. |
| 2010/0159357 A1 | 6/2010 | Otawa et al. |
| 2010/0163252 A1 | 7/2010 | De La Mothe et al. |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2010/0289198 A1 | 11/2010 | Balsells et al. |
| 2011/0027573 A1 | 2/2011 | Strock et al. |
| 2011/0033721 A1 | 2/2011 | Rohatgi |
| 2011/0045724 A1 | 2/2011 | Bahukudumbi |
| 2011/0098202 A1 | 4/2011 | James et al. |
| 2011/0140365 A1 | 6/2011 | Dietle et al. |
| 2011/0157772 A1 | 6/2011 | Zhamu et al. |
| 2011/0187058 A1 | 8/2011 | Curry et al. |
| 2011/0200825 A1 | 8/2011 | Chakraborty et al. |
| 2011/0278506 A1 | 11/2011 | Toyokawa |
| 2011/0284213 A1 | 11/2011 | Willberg |
| 2012/0107590 A1 | 5/2012 | Xu et al. |
| 2012/0205873 A1 | 8/2012 | Turley |
| 2013/0001475 A1 | 1/2013 | Christ et al. |
| 2013/0012644 A1 | 1/2013 | Niihara et al. |
| 2013/0045423 A1 | 2/2013 | Lim et al. |
| 2013/0096001 A1 | 4/2013 | Choi et al. |
| 2013/0114165 A1 | 5/2013 | Mosendz et al. |
| 2013/0192853 A1 | 8/2013 | Themig |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0267816 A1 | 9/2015 | Boskovski |
| 2016/0032671 A1 | 2/2016 | Xu et al. |
| 2016/0089648 A1 | 3/2016 | Xu et al. |
| 2016/0108703 A1 | 4/2016 | Xu et al. |
| 2016/0130519 A1 | 5/2016 | Lei et al. |
| 2016/0136923 A1 | 5/2016 | Zhao et al. |
| 2016/0136928 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0342802 A1 | 11/2017 | Zhao et al. |

(56) References Cited

U.S. PATENT DOCUMENTS

FOREIGN PATENT DOCUMENTS

| | | |
|---|---|---|
| EP | 0539011 A1 | 4/1993 |
| EP | 0747615 B1 | 10/2001 |
| EP | 2056004 A1 | 5/2009 |
| EP | 2586963 A1 | 5/2013 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |
| WO | 2014028149 A1 | 2/2014 |
| WO | 2015021627 A1 | 2/2015 |
| WO | 2016085594 A1 | 6/2016 |

OTHER PUBLICATIONS

International Written Opinion, International Application No. PCT/US2017/025000, dated Aug. 18, 2017, Korean Intellectual Property Office; International Written Opinion 9 pages.

Baxter et al., "Microstructure and solid particle erosion of carbon-based materials used for the protection of highly porous carbon-carbon composite thermal insulation", Journal of Materials Science, vol. 32, 1997, pp. 4485-4492.

Etter et al., "Aluminium carbide formation in interpenetrating graphite/aluminium composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites—An Outlook", The Minerals, Metals & Materials Society, Apr. 5, 2014, 10 pages.

Pohlmann et al., "Magnesium alloy-graphite composites with tailored heat conduction properties for hydrogen storage applications", International Journal of Hydrogen Energy, 35 (2010), pp. 12829-12836.

Rashad et al. "Effect of of Graphene Nanoplatelets addition on mechanical properties of pure aluminum using a semi-powder method", Materials International, Apr. 20, 2014, vol. 24, pp. 101-108.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

* cited by examiner

COATINGS CONTAINING CARBON COMPOSITE FILLERS AND METHODS OF MANUFACTURE

BACKGROUND

This disclosure relates to coatings and in particular to coatings comprising carbon composite fillers and methods of manufacture.

Coatings have widespread applications in various industries. Polymer coatings have been used in downhole tools to modify surface hydrophilicity, corrosion resistance, or friction and wear resistance. Ceramic coatings are used on bearings and valves to improve wear resistance. Coatings can also be used to change surface electrical or thermal properties. Due to their broad use, there remains a need in the art for new coatings having balanced properties.

BRIEF DESCRIPTION

An article comprises a substrate, a coating disposed on a surface of the substrate, the coating comprising a carbon composite dispersed in one or more of the following: a polymer matrix; a metallic matrix; or a ceramic matrix, wherein the carbon composite comprises carbon and a binder containing one or more of the following: $SiO_2$; Si; B; $B_2O_3$; a filler metal; or an alloy of the filler metal, and the filler metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

A method of coating a substrate comprises depositing a matrix material and a carbon composite on a surface of the substrate.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
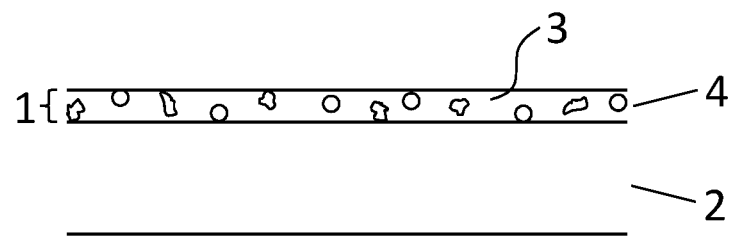
FIG. 1 is a schematic illustration of an article according to an embodiment of the disclosure.

The inventors hereof have found that carbon composites formed from graphite and micro- or nano-sized binders can be used in various coatings as filler to further improve the coatings' mechanical, chemical, electrical, or thermal properties. In particular, the incorporation of carbon composites can improve the sealing performance of polymer coatings when used in certain applications. The self-lubricating property of carbon composites can improve wear resistance of the coatings. The carbon composite filler can also bring high thermal and electrical conductivity to the coatings. Moreover, carbon composites have excellent thermal and chemical stability and can improve the performance of the coatings in harsh environments.

An article according to the disclosure comprises a substrate and a coating disposed on a surface of the substrate. The coating includes a matrix and a carbon composite dispersed in the matrix. The matrix can be a polymer matrix; a metallic matrix; a ceramic matrix; or a combination comprising at least one of the foregoing. The amount of the carbon composite in the matrix can vary depending on the desired properties of the coating and the specific composition of the matrix. In an embodiment, the carbon composite is present in an amount of about 0.1 wt. % to about 75 wt. %, about 0.1 wt. % to about 50 wt. %, about 1 wt. % to about 40 wt. % or about 5 wt. % to about 30 wt. %, based on the total weight of the coating.

The polymer matrix can comprise a thermoplastic polymer, an elastomer, or a combination comprising at least one of the foregoing. The polymer matrix can comprise a blend of polymers. The polymer matrix can also comprise an oligomer, a homopolymer, a copolymer, a crosslinked polymer, or a combination comprising at least one of the foregoing.

Exemplary polymers in the polymer matrix include a polyaryletherketone, a fluoropolymer, a polyarylene sulfide such as a polyphenylene sulfide, a polyarylene such as a polyphenylene, a polyarylene sulfone such as a polyphenylsulfone, a polyether sulfone, a polyarylene ether, a polyurea, a polyurethane, a polycarbonate, a polyimide such as a polyetherimide, an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a crosslinked product thereof, or a combination comprising at least one of the foregoing.

The polyaryletherketone can have a repeat unit that includes a phenylene group, ether group, ketone group, derivatives thereof, or a combination thereof. The phenyl ring of the repeat unit can be substituted in an embodiment. Exemplary polyaryletherketone polymers include polyetherketone (PEK), polyetheretherketone (PEEK), polyetherketoneketone (PEKK), polyetheretherketoneketone (PEEKK), polyetherketoneetherketoneketone (PEKEKK), and the like.

In an embodiment, the polymer is a fluoropolymer. Exemplary fluoropolymer polymers include polytetrafluoroethylene (PTFE, available under the trade name Teflon from DuPont), polyethylenetetrafluoroethylene (ETFE, available under the trade name Teflon ETFE or Tefzel from DuPont), fluorinated ethylene propylene copolymer (FEP, available under the trade name Teflon FEP from DuPont), perfluoroalkoxy polymer (PFA, available under the trade name Teflon PFA from DuPont), polyvinylidene fluoride (PVDF, available under the trade name Hylar from Solvay Solexis S.p.A.), polyvinylfluoride (PVF, available under the trade name Tedlar from DuPont), polychlorotrifluoroethylene (PCTFE, available under the trade name Kel-F from 3M Corp. or Neoflon from Daikin), polyethylenechlorotrifluoroethylene (ECTFE, available under the trade name Halar ECTFE from Solvay Solexis S.p.A.), chlorotrifluoroethylenevinylidene fluoride (FKM fluorocarbon, available under the trade name Viton from FKM-Industries), perfluoroelastomer such as FFKM (available under the trade name Kalrez from DuPont), tetrafluoroethylene-propylene elastomeric copolymers such as those available under the trade name Aflas from Asahi Glass Co), perfluoropolyether (available under the trade name Krytox from DuPont), perfluorosulfonic acid (available under the trade name Nafion from DuPont), and the like. Other exemplary fluoropolymers include copolymers of vinylidene fluoride and hexafluoropropylene and terpolymers of vinylidene fluoride, hexafluoropropylene, and tetrafluoroethylene.

In another embodiment, the polymer matrix comprises a self-reinforced polyphenylene (SRP). SRP can have a repeat unit that includes 1,3-phenylene, benzoyl-1,4-phenylene, phenoxy-benzoyl-1,4-phenylene, derivatives thereof, or a combination thereof. The phenyl ring of the repeat unit can be substituted. As a specific example, the SRP is a copolymer of benzoyl-1,4-phenylene and 1,3-phenylene. This SRP can be made by a method described in U.S. Pat. No. 5,976,437.

In a particular embodiment, the polymer is a crosslinked polyphenylene sulfide (x-PPS), crosslinked polyphenylsulfone (x-PPSU), crosslinked self-reinforced polyphenylene (x-SRP), crosslinked polyethersulfone (x-PESU), or a combination comprising at least one of the foregoing. The crosslinked product includes a crosslink between, for example, x-PPS, x-PPSU, x-SRP, x-PESU, or a combination comprising at least one of the foregoing. Descriptions of x-PPS, x-PPSU, and x-SRP and processes for making each are described in U.S. Pat. Nos. 8,604,157, 8,929,119, 8,939,222, 9,120,898, and 9,144,925.

The metallic matrix in the coating includes Ni, Cu, Ag, Au, Sn, Zn, Fe, In, W, Ti, Co, Al, Mg, Cr, or Mo, or alloys of these metals, or a combination that includes at least one of these materials. In an embodiment, the metallic material includes an Ni-base alloy, Ti-based alloy, or Al-based alloy, where Ni, Ti, or Al is the majority constituent element by weight or atom percent. In another embodiment, the metallic material includes an Ni—B alloy, an Ni—P alloy, or a Ni—W alloy. Exemplary Ni—B alloys contain up to about 10 percent by weight of boron, the balance being Ni and trace impurities. Exemplary Ni—P alloy contains about 14 percent or less by weight P and the balance Ni and trace impurities. An Ni—W alloy (or W—Ni alloy) includes up to about 76 percent by weight of tungsten, and more particularly up to about 30 percent by weight of tungsten. In certain embodiments, this may include about 0.1 to about 76 percent by weight of tungsten, and more particularly about 0.1 to about 30 percent by weight of tungsten. The trace impurities will be those known conventionally for Ni and Ni alloys based on the methods employed to process and refine the constituent element or elements. Exemplary aluminum-based alloys include Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, where X represents alloying elements including Zn, Mn, Si, Cr, Fe, Ni, Ti, V, Cu, Pb, Bi, and Zr.

The ceramic matrix is not particularly limited and can be selected depending on the particular substrate used. Examples of the ceramic matrix include an oxide-based ceramic, nitride-based ceramic, carbide-based ceramic, boride-based ceramic, silicide-based ceramic, or a combination thereof. In an embodiment, the oxide-based ceramic is silica ($SiO_2$) or titanium dioxide ($TiO_2$). The oxide-based ceramic, nitride-based ceramic, carbide-based ceramic, boride-based ceramic, or silicide-based ceramic can contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like).

The coating comprises a carbon composite, which contains carbon and an inorganic binder. The carbon can be graphite. As used herein, graphite includes one or more of natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

In an embodiment, the carbon composites comprise carbon microstructures having interstitial spaces among the carbon microstructures; wherein the binder is disposed in at least some of the interstitial spaces. In an embodiment, the carbon microstructures comprise unfilled voids within the carbon microstructures. In another embodiment, both the interstitial spaces among the carbon microstructures and the voids within the carbon microstructures are filled with the binder or a derivative thereof.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. In an embodiment, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the carbon composites, particularly, expanded carbon composites can be preserved. In another embodiment, to achieve high strength, the voids within the carbon microstructures are filled with the binder or a derivative thereof. Methods to fill the voids within the carbon microstructures include vapor deposition.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bound by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: SiO$_2$; Si; B; or B$_2$O$_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as INCONEL, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composites can be micro- or nano-sized. In an embodiment, the binder has an average particle size of about 0.05 to about 250 microns, about 0.05 to about 50 microns, about 1 micron to about 40 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the microstructures to the binder layer. The first interface layer and the second interface layer can have the same or different compositions.

The interface layer comprises one or more of the following: a C—metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting SiO$_2$ or Si with the carbon of carbon microstructures, or B$_4$C formed by reacting B or B$_2$O$_3$ with the carbon of the carbon microstructures. When a combination of binder materials is used, the interface layer can comprise a combination of these carbides. The carbides can be salt-like carbides such as aluminum carbide, covalent carbides such as SiC and B$_4$C, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the carbon composites. The binder is present in an amount of about 5 wt. % to about 75 wt. % or about 20 wt. % to about 50 wt. %, based on the total weight of the carbon composites. In the carbon composites, the weight ratio of carbon relative to the binder is about 1:4 to about 20:1, or about 1:4 to about 4:1, or about 1:1 to about 4:1.

Carbon composites can be manufactured by methods described in U.S. Publication No. 2016/0089648.

The coating formed on the substrate can completely cover the substrate or a surface of the substrate. The thickness of the coating can be from about 5 μm to about 10 mm, specifically about 10 μm to about 5 mm. In an embodiment, the coating is continuous and does not have voids, microvoids, fractures, or other defects, including pinholes and the like.

The substrate can be a polymer, metal or ceramic material. Exemplary materials for the substrate can include those described herein for the coating matrix. In an embodiment, the substrate comprises a metal of elements from Group 2 to Group 12 of the periodic table, alloys thereof, or a combination thereof. Exemplary metals are magnesium, aluminum, titanium, manganese, iron, cobalt, nickel, copper, molybdenum, tungsten, palladium, chromium, ruthenium, gold, silver, zinc, zirconium, vanadium, silicon, or a combination thereof, including alloys thereof. Metal alloys include, for example, an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. Exemplary metal alloys include steel, nichrome, brass, pewter, bronze, invar, inconel, hastelloy, MgZrZn, MgAlZn, AlCuZnMn, and AlMgZnSiMn.

In an embodiment, the substrate comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as INCONEL, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. A reinforcing agent known in the art can be included in the substrate if desired.

The substrate can be used without surface processing or can be processed, including chemically, physically, or mechanically treating the substrate. For example, the substrate can be treated to roughen or increase a surface area of the substrate, e.g., by sanding, lapping, or sand blasting. A surface of the substrate can also be cleaned to remove contaminants through chemical and/or mechanical means.

The substrate can be any shape. Exemplary shapes include a cube, sphere, cylinder, toroid, polygonal shape, helix, truncated shape thereof, or a combination thereof. The longest linear dimension of the substrate can be from 500 nm to hundreds of meters, without limitation. The substrate can have a thermal decomposition temperature that can withstand, without decomposition or degradation, exposure to a temperature from −10° C. to 800° C. However, coating disposed on the substrate can provide temperature shielding or thermal conductance to carry heat away from the substrate so that the substrate does not experience a temperature near its thermal decomposition temperature.

Optionally, the coating is bound to the substrate through a binding layer. The thickness of the binding layer can be about 50 nm to about 2 mm or about 100 nm to about 1 mm. The binding layer can comprise a primer, metals, alloys thereof, or solid solutions of metals. Other known inorganic or organic binders can also be used.

FIG. 1 is a schematic illustration of an article according to an embodiment of the disclosure. As shown in FIG. 1, the article comprises substrate 2 and coating 1 disposed on a surface of substrate 1. The coating 1 comprises matrix 4 and carbon composite 3 disposed in matrix 4.

Methods of forming a coating comprises combining a carbon composite with a matrix material to provide a coating composition; and disposing the coating composition on a surface of a substrate to form the coating.

The carbon composite can be in different forms such as powders, fibers, pellets, or the like. The powder comprises particles having an average size of about 1 µm to about 1 cm. The pellets comprise particles having an average size of about 500 microns to about 5 cm. In an embodiment, the density and the size of the carbon composites are selected in such a way that the carbon composites are uniformly dispersed in the matrix material. In an embodiment, to facilitate uniform distribution of the carbon composite in the matrix material, the carbon composite is in the form of a powder. To ensure uniform dispersion, mixing, blending, or other known method can be used.

The matrix material can be the material in the polymer matrix. Alternatively, the matrix material in the coating composition is a precursor of the material in the polymer matrix. For example, the matrix material in the coating composition is an uncrosslinked polymer, which is crosslinked while the coating composition is applied to a surface of a substrate or after the coating composition is disposed on a surface of the substrate. A known crosslinking agent can be included in the coating composition. As another specific example, the matrix material in the coating composition comprises one or more monomers or oligomers, which can be polymerized or cured later forming a coating comprising polymerized or cured matrix material. The matrix material can also include at least one metal or metal alloy which is sintered forming the metallic matrix.

The coating composition can be in the form of a powder, a dispersion, a paste, a solution, or an emulsion. When the matrix material is a material or a precursor for a polymer matrix, the matrix material can be dispersed or dissolved in a solvent forming a slurry or a solution. For this embodiment, combining the carbon composite with the matrix material includes dispersing the carbon composite in the slurry or the solution comprising the matrix material. Surfactants and dispersing agents can be included in the slurry or solution to facilitate uniform dispersion of the carbon composite and the matrix material. When the matrix material is a material or a precursor for a metallic or ceramic matrix, the matrix material can be combined with the carbon composite and organics forming a paste.

A coating composition comprising a matrix material for a polymer matrix and a carbon composite can be disposed on a surface of a substrate by known methods such as spray coating, brushing, screen casting, blade casting, drop casting, spin coating, molding, and the like. In the instance where the matrix material in the coating composition is a precursor of the material in the polymer matrix, the coated composition can be further treated to polymerize, cure, or crosslink the matrix material.

A coating composition such as a paste comprising a matrix material for a metallic or ceramic matrix and a carbon composite can be disposed on a surface of a substrate by brushing, immersion dipping, or molding. If desired, the coated composition can be sintered to form a dense coating layer and/or to form a bonding layer between the coating and the substrate. Methods of sintering are not particularly limited and include hot pressing, spark plasma sintering, and the like.

In some embodiments, the matrix material and the carbon composite are deposited on a surface of a substrate simultaneously. An exemplary method includes thermal spray coating where a metal or ceramic melt flow and a carbon composite flow optionally carried by a gas are sprayed onto a target substrate simultaneously.

In other embodiments, the mixture of matrix material and the carbon composite is deposited on a surface of a substrate by all-solid state coating processes. An exemplary method includes cold gas-dynamic spray (or simply cold spray) that is a process of applying coatings by exposing a metallic or dielectric substrate to a high velocity (300-1200 m/s) jet of particles accelerated by a supersonic jet of compressed gas at a temperature that is always lower than the melting point of the material, resulting in a coating on a substrate from particles in the solid state.

Electroplating can also be used to form a coating comprising a carbon composite and a metallic matrix. In the method, the carbon composite is combined with a precursor for the metallic matrix, and both the carbon composite and the metallic matrix are deposited on a surface of a substrate under an electric field. Illustratively, a coating comprising Ni as metallic matrix material may be deposited using a nickel sulfate bath containing a carbon composite. In another exemplary embodiment, a coating comprising an Ni—P alloy as metallic matrix may be deposited by an electrochemical deposition using a bath that includes nickel sulfate, sodium hypophosphite, and a carbon composite. A coating comprising an Ni—W alloy as metallic matrix may be deposited by an electrochemical deposition using a bath that includes nickel sulfate and sodium tungstate.

Figure 2:
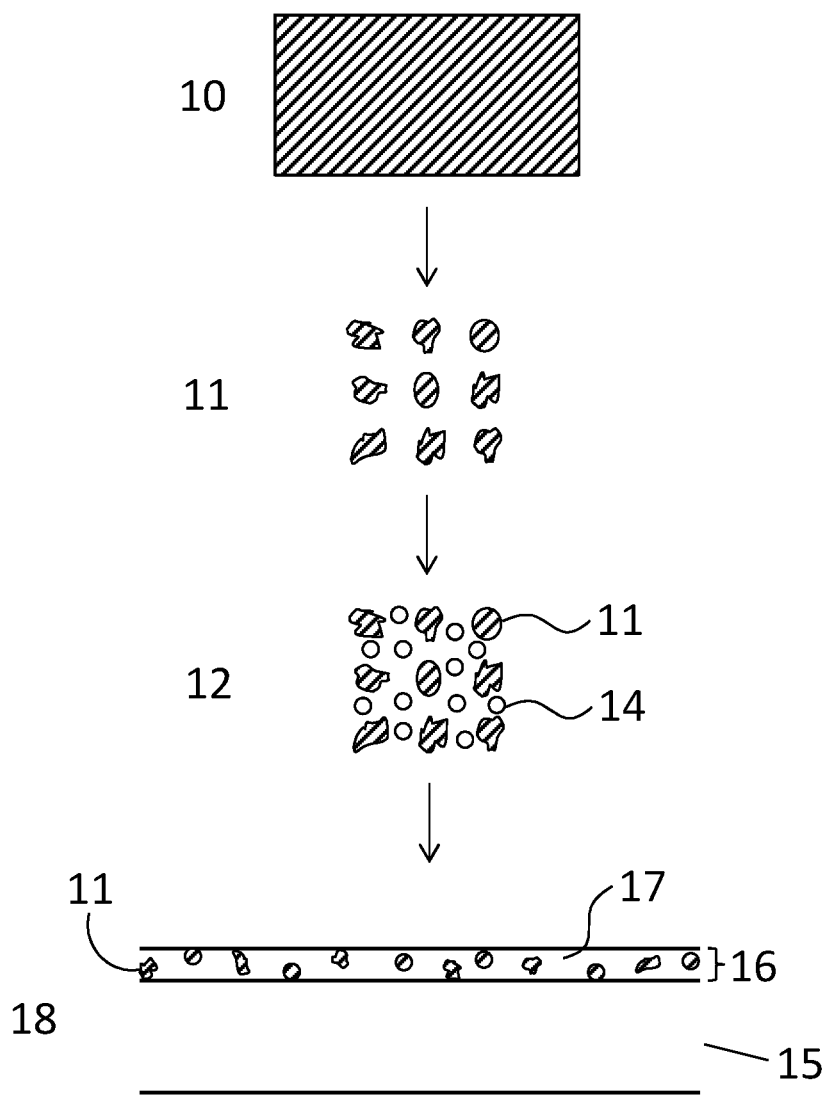
FIG. 2 illustrates an exemplary process to coat a substrate.

An exemplary method is illustrated in FIG. 2. As shown in FIG. 2, bulk carbon composite 10 is milled into a carbon composite powder 11, which is combined with a matrix material 14 forming a coating composition 12. The coating composition is disposed on a surface of a substrate 15 forming a coated substrate 18. The coating 16 comprises carbon composite 11 disposed in matrix 17.

If needed, a binding layer can be formed between the coating and the substrate. The binding layer can be formed from a primer layer coating on the substrate. Alternatively, the binding layer can be formed in situ by heating the coating and the coated surface. A pressure may be applied during the heating.

Articles containing coatings as disclosed herein are useful for a wide variety of applications including but are not limited to electronics, atomic energy, hot metal processing, coatings, aerospace, automotive, oil and gas, and marine applications. Exemplary articles include coated bearings; coated valves such as safety valves; coated pipelines, for example, those used in chemical plants; coated pistons, and coated shafts. Coated bearings can be used in downhole tools such as ESP pump, drilling bit, or the like or in pharmacy or food industry where oil lubricants are prohibited for safety concerns. Coated pistons and coated shafts can be used in various machine or tool parts including engines and gears, and the like for applications in the oil and gas industry, automobile industry, or aerospace industry.

Set forth below are various embodiments of the disclosure.

Embodiment 1

An article comprising a substrate, a coating disposed on a surface of the substrate, the coating comprising a carbon composite dispersed in one or more of the following: a polymer matrix; a metallic matrix; or a ceramic matrix, wherein the carbon composite comprises carbon and a binder containing one or more of the following: $SiO_2$; Si; B; $B_2O_3$; a filler metal; or an alloy of the filler metal, and the filler metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

Embodiment 2

The article of Embodiment 1, wherein the carbon composite is present in an amount of about 0.1 wt. % to about 75 wt. % based on the total weight of the coating.

Embodiment 3

The article of Embodiment 1 or Embodiment 2, wherein the coating has a thickness of about 5 µm to about 10 mm.

Embodiment 4

The article of any one of Embodiments 1 to 3, wherein the carbon composite comprises at least two carbon microstructures; and a binding phase disposed between the at least two carbon microstructures.

Embodiment 5

The article of Embodiment 4, wherein the binding phase comprises a binder layer and an interface layer bonding one of the at least two carbon microstructures to the binder layer, wherein the interface layer comprises one or more of the following: a C-metal bond; a C—B bond; a C—Si bond; a C—O—Si bond; a C—O-metal bond; or a metal carbon solution.

Embodiment 6

The article of any one of Embodiments 1 to 5, wherein the carbon comprises graphite.

Embodiment 7

The article of any one of Embodiments 1 to 6, wherein the coating comprises a metallic matrix including one or more of the following: Ni; Cu; Ag; Au; Sn; Zn; Fe; In; W; Ti; Co; Al; Mg; Cr; or Mo; or an alloy thereof.

Embodiment 8

The article of any one of Embodiments 1 to 6, wherein the coating comprises a ceramic matrix comprising one or more of the following: an oxide-based ceramic; nitride-based ceramic; carbide-based ceramic; boride-based ceramic; or silicide-based ceramic.

Embodiment 9

The article of any one of Embodiments 1 to 6, wherein the polymer matrix comprises a thermoplastic polymer, an elastomer, or a combination thereof.

Embodiment 10

The article of any one of Embodiments 1 to 9, further comprising a binding layer disposed between the coating and the substrate.

Embodiment 11

The article of any one of Embodiments 1 to 10, wherein the substrate comprises one or more of the following: a metal; a polymer; or ceramics.

Embodiment 12

The article of any one of Embodiments 1 to 11, wherein the article is a coated bearing, a coated pipeline, a coated valve, a coated piston, or a coated shaft.

Embodiment 13

A method of coating a substrate, the method comprising: depositing a matrix material and a carbon composite on a surface of a substrate, the carbon composite comprising carbon and a binder; the binder comprising one or more of the following: $SiO_2$; Si; B; $B_2O_3$; a metal; or an alloy of the metal; and the metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

Embodiment 14

The method of Embodiment 13, further comprising combining a matrix material with a carbon composite to form a coating composition.

Embodiment 15

The method of Embodiment 14, wherein depositing a matrix material and a carbon composite comprises disposing the coating composition on a surface of the substrate.

Embodiment 16

The method of Embodiment 15, wherein the matrix material comprises a material or a precursor for the polymer matrix, and combing the matrix material with the carbon composite comprises dispersing the carbon composite in a dispersion of the matrix material.

Embodiment 17

The method of Embodiment 16, wherein disposing the coating composition comprises one or more of the following: spray coating; brushing; screen casting; blade casting; drop casting; spin coating; or molding.

Embodiment 18

The method of Embodiment 15, wherein the matrix material comprises a material or a precursor for the metallic or ceramic matrix, and the matrix material is combined with a carbon composite and an organic compound to form a coating composition in the form of a paste.

Embodiment 19

The method of Embodiment 18, wherein disposing the coating composition comprises brushing, immersion dipping, or molding.

Embodiment 20

The method of Embodiment 13, wherein disposing the matrix material and the carbon composite is an all-solid state coating process.

Embodiment 21

The method of Embodiment 14, wherein disposing the matrix material and the carbon composite comprises thermal spraying the matrix material and the carbon composite simultaneously on the surface of the substrate.

Embodiment 22

The method of Embodiment 14, wherein the coating comprises a metallic matrix, and depositing the matrix material and the carbon composite is conducted via electroplating.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. An article comprising
   a substrate,
   a coating disposed on a surface of the substrate, the coating comprising a carbon composite dispersed in one or more of the following: a polymer matrix; a metallic matrix; or a ceramic matrix, wherein the article is a coated bearing, a coated pipeline, a coated valve, a coated piston, or a coated shaft, the carbon composite comprises carbon and a binder containing one or more of the following: $SiO_2$; Si; B; $B_2O_3$; a filler metal; or an alloy of the filler metal, the filler metal comprises one or more of the following: aluminum; copper; titanium; nickel; tungsten; chromium; iron; manganese; zirconium; hafnium; vanadium; niobium; molybdenum; tin; bismuth; antimony; lead; cadmium; or selenium, the carbon composite is present in an amount of about 0.1 wt. % to about 75 wt. % based on the total weight of the coating, the metallic matrix comprises one or more of the following: Ni; Cu; Ag; Au; Sn; Zn; Fe; In; W; Ti; Co; Al; Mg; Cr; or Mo; or an alloy thereof, the ceramic matrix comprises one or more of the following: an oxide-based ceramic; nitride-based ceramic; carbide-based ceramic; boride-based ceramic; or silicide-based ceramic, the oxide based ceramic being silica or titanium dioxide, and the polymer matrix comprises a polyaryletherketone, a fluoropolymer, a polyarylene sulfide; a polyarylene, a polyarylene sulfone; a polyether sulfone, a polyarylene ether; a polyurea, a polyurethane; a polycarbonate; a polyimide, a polyetherimide; an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; or a combination comprising at least one of the foregoing.

2. The article of claim 1, wherein the carbon composite is present in an amount of about 0.1 wt. % to about 50 wt. % based on the total weight of the coating.

3. The article of claim 1, wherein the coating has a thickness of about 5 μm to about 10 mm.

4. The article of claim 1, wherein the carbon composite comprises at least two carbon microstructures; and a binding phase disposed between the at least two carbon microstructures.

5. The article of claim 4, wherein the binding phase comprises a binder layer and an interface layer bonding one of the at least two carbon microstructures to the binder layer, wherein the interface layer comprises one or more of the following: a C-metal bond; a C—B bond; a C—Si bond; a C—O—Si bond; a C—O-metal bond; or a metal carbon solution.

6. The article of claim 1, wherein the carbon comprises graphite.

7. The article of claim 1, further comprising a binding layer disposed between the coating and the substrate.

8. The article of claim 1, wherein the substrate comprises one or more of the following: a metal; a polymer; or ceramics.

9. A method of making an article of claim 1, the method comprising:

depositing a matrix material and a carbon composite on a surface of a substrate, the carbon composite comprising carbon and a binder;

the binder comprising one or more of the following: $SiO_2$; Si; B; $B_2O_3$; a metal; or an alloy of the metal; and the metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

10. The method of claim 9, further comprising combining a matrix material with a carbon composite to form a coating composition.

11. The method of claim 10, wherein depositing a matrix material and a carbon composite comprises disposing the coating composition on a surface of the substrate.

12. The method of claim 11, wherein the matrix material comprises a material or a precursor for the polymer matrix, and combining the matrix material with the carbon composite comprises dispersing the carbon composite in a dispersion of the matrix material.

13. The method of claim 12, wherein disposing the coating composition comprises one or more of the following: spray coating; brushing; screen casting; blade casting; drop casting; spin coating; or molding.

14. The method of claim 11, wherein the matrix material comprises a material or a precursor for the metallic or ceramic matrix, and the matrix material is combined with a carbon composite and an organic compound to form a coating composition in the form of a paste.

15. The method of claim 4, wherein disposing the coating composition comprises brushing, immersion dipping, or molding.

16. The method of claim 9, wherein disposing the matrix material and the carbon composite is an all-solid state coating process.

17. The method of claim 10, wherein disposing the matrix material and the carbon composite comprises thermal spraying the matrix material and the carbon composite simultaneously on the surface of the substrate.

18. A method of coating a substrate, the method comprising:

depositing a matrix material and a carbon composite on a surface of a substrate to form a coating, the carbon composite comprising carbon and a binder;

the binder comprising one or more of the following: $SiO_2$; Si; B; $B_2O_3$; a metal; or an alloy of the metal; and the metal comprising one or more of the following: aluminum; copper; titanium; nickel; tungsten; chromium; iron; manganese; zirconium; hafnium; vanadium; niobium; molybdenum; tin; bismuth; antimony; lead; cadmium; or selenium, wherein the coating comprises a metallic matrix, and depositing the matrix material and the carbon composite is conducted via electroplating.

* * * * *